United States Patent
Ginzburg et al.

(10) Patent No.: US 7,545,773 B2
(45) Date of Patent: Jun. 9, 2009

(54) MULTIPLE MEDIA ACCESS CONTROL APPARATUS AND METHODS

(75) Inventors: Boris Ginzburg, Haifa (IL); Izoslav Tchigevsky, Kiryat Haim (IL)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 11/169,510

(22) Filed: Jun. 29, 2005

(65) Prior Publication Data
US 2007/0005675 A1 Jan. 4, 2007

(51) Int. Cl.
*H04Q 7/00* (2006.01)

(52) U.S. Cl. .................. 370/329; 370/345; 370/431; 370/252; 370/338; 370/319; 370/466; 455/134; 455/522; 455/69; 455/140; 455/135

(58) Field of Classification Search .......... 705/1; 455/134, 522, 574, 412.1, 572, 515, 422, 455/414; 416/12; 370/395.2, 338, 252, 431, 370/465, 466, 329, 390, 310, 319; 713/193; 716/12, 11, 14, 9

See application file for complete search history.

(56) References Cited

U.S. PATENT DOCUMENTS

| | | | |
|---|---|---|---|
| 7,113,484 B1* | 9/2006 | Chapman et al. | 370/252 |
| 7,178,124 B1* | 2/2007 | Makarov et al. | 716/12 |
| 7,187,912 B2* | 3/2007 | Ginzburg | 455/134 |
| 2002/0107984 A1* | 8/2002 | Rawson, III | 709/246 |
| 2004/0037291 A1* | 2/2004 | Attar et al. | 370/395.4 |
| 2004/0038697 A1* | 2/2004 | Attar et al. | 455/522 |
| 2004/0047324 A1* | 3/2004 | Diener | 370/338 |
| 2004/0073786 A1* | 4/2004 | O'Neill et al. | 713/155 |
| 2004/0179546 A1* | 9/2004 | McDaniel et al. | 370/463 |
| 2005/0226183 A1* | 10/2005 | Penumetsa | 370/329 |
| 2005/0251402 A1* | 11/2005 | Olsen et al. | 705/1 |
| 2006/0129848 A1* | 6/2006 | Paksoy et al. | 713/193 |
| 2006/0221916 A1* | 10/2006 | Taylor et al. | 370/338 |
| 2007/0008967 A1* | 1/2007 | Bressler et al. | 370/390 |
| 2007/0070960 A1* | 3/2007 | Barak et al. | 370/338 |

FOREIGN PATENT DOCUMENTS

| | | |
|---|---|---|
| EP | 0713309 A2 | 5/1996 |
| EP | 1482712 A1 | 12/2004 |

OTHER PUBLICATIONS

"International Search Report for corresponding PCT Application No. PCT/US2006/026020", (Nov. 9, 2006), 3 pgs.
"Written Opinion of the International Searching Authority for corresponding PCT Application No. PCT/US2006/026020", (Nov. 9, 2006), 5 pgs.

* cited by examiner

*Primary Examiner*—Rafael Pérez -Gutiérrez
*Assistant Examiner*—Joseph Arevalo
(74) *Attorney, Agent, or Firm*—Schwegman, Lundberg & Woessner, P.A.; Gregory J. Gorrie

(57) ABSTRACT

Embodiments of twin media access control apparatus and methods are generally described herein. Other embodiments may be described and claimed. The present arrangement provides for eliminating a functional media access control unit from one or more processors in a processor/co-processor(s) situation. A dual media access control interface of the processor handles both the network requests of the processor and all co-processors, such as proactive management processors.

7 Claims, 5 Drawing Sheets

MULTIPLE MEDIA ACCESS CONTROL APPARATUS AND METHODS

BACKGROUND

The present subject matter pertains to wireless communication systems and, more particularly, to media access control methods and apparatus for multiple network nodes.

In wireless local area networks (LANs), devices are separated by distinct media access control (MAC) protocol addresses. This is done even when the two or more units are closely related, such as processors or co-processors. These processors or co-processors typically are connected to a wireless network via a network interface card (NIC).

A wireless protocol stack can operate in two modes. The first mode is a "single MAC" mode, where the processors share one MAC address and single internet protocol (IP) address. In this case, the traffic for an embedded processor (EP) may be identified by dedicated port numbers.

The second mode is a "double MAC" mode, where both processors have different MAC addresses and different IP addresses. The processors are different and independent stations.

The "double MAC" mode is based on two upper MACs running in parallel on the processors that synchronize their activity using messages between two processors. The "double MAC" architecture may need constant synchronization between two MAC processors. A NIC supports two MAC devices and solves conflicts between commands received between the two processors. When both processors are working in parallel, the data frames are sent and received through two independent wireless stacks.

DETAILED DESCRIPTION

Figure 1:
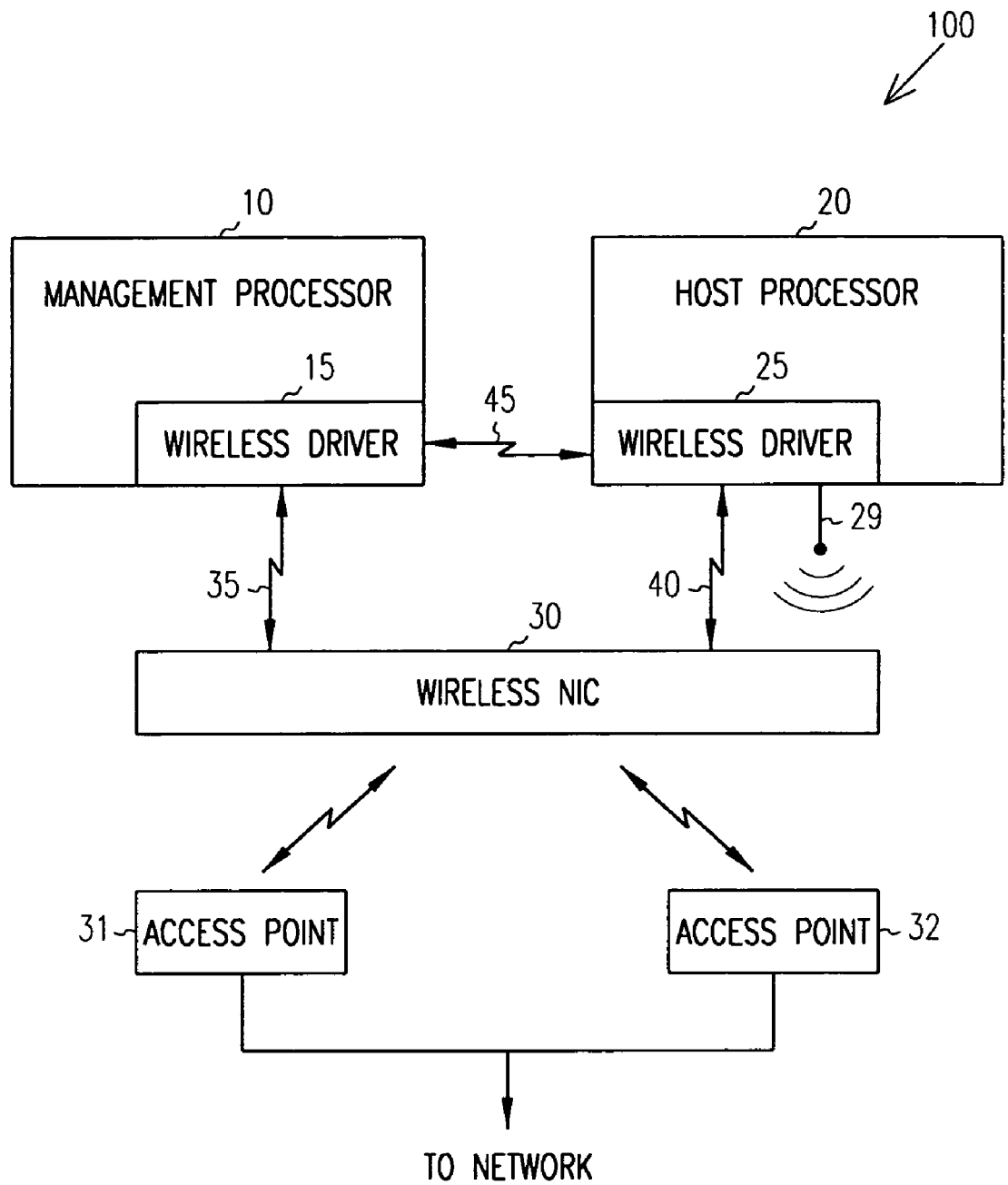
FIG. 1 is a block diagram of a wireless communication interface network in accordance with various embodiments of the present invention.

FIG. 1 is a block diagram of a wireless communication interface network 100 in accordance with various embodiments of the present invention. Management processor 10 may include wireless driver 15 that wirelessly couples the management processor 10 to host processor 20 and to wireless network interface card (NIC) 30.

Similarly, host processor 20 may have wireless driver 25 that wirelessly couples host processor 20 to management processor 10 and to wireless NIC 30 via antenna 29. Antenna 29 may include one or more directional or omni-directional antennas, including, for example, dipole antennas, monopole antennas, patch antennas, loop antennas, microstrip antennas or other types of antennas suitable for transmission of radio frequency signals. In some embodiments, instead of two or more antennas, a signal antenna with multiple apertures may be used. Wireless NIC 30 may couple processors 10 and 20 to a network (not shown) for concurrent communication with a network via a number of access points, such as access point (AP) 31 and access point (AP) 32. The wireless NIC 30 may also be coupled directly to the network.

In some embodiments of the invention, link 35 is unnecessary because management processor 10 communicates through host processor 20 and wireless link 40. Wireless link 40 couples host processor 20 to wireless NIC 30. Wireless link 45 couples wireless driver 15 to wireless driver 25.

Figure 2:
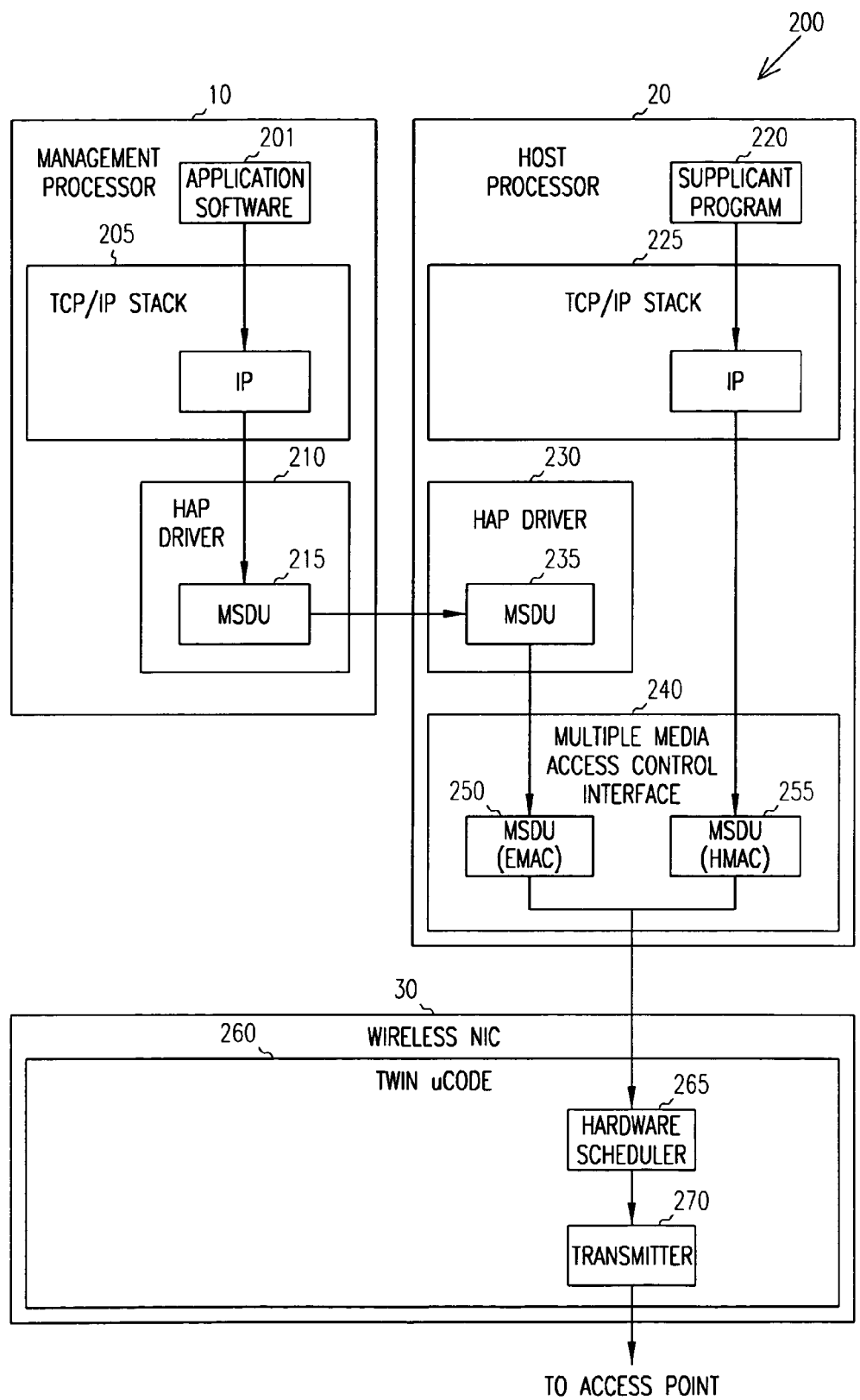
FIG. 2 is a block diagram of wireless telecommunication interface network with multiple media access control for transmission in accordance with various embodiments of the present invention.

FIG. 2 is a block diagram of a wireless communication interface network with twin media access control 200 for transmission in accordance with various embodiments of the present invention. Management processor 10, host processor 20 and wireless NIC 30 are similar to those shown in FIG. 1, except that management processor 10 is no longer directly coupled to wireless NIC 30 via link 35. The coupling of management processor 10 and host processor 20 to any of a plurality of wireless APs 31-32 of FIG. 1 is via a multiple media access control processor supported by management processor 10, host processor 20 and wireless NIC 30.

Management processor 10 has application software 201 that controls management processor 10 to perform proactive functions such as, asset management; remote diagnostics and anti-virus support, for example, but not by way of limitation. Application software 201 may place data or messages for transmission on to the network (not shown) on TCP/IP stack 205. From stack 205 the data is sent to HAP (hardware assisted protocol) driver 210.

HAP driver 210 includes MSDU (MAC service data unit) 215. MSDU 215 may be a transmission device driver. MSDU 215 may implement one of the standards of the Institute of Electronics and Electrical Engineers (IEEE) 802.11, although the scope of the invention is not limited in this respect. The IEEE 802.11 Standards (std.) such as Sections a and b began to be published in 1998. In 2003, an IEEE 802.11 Task Group n (TGn) was created. TGn's objective is to define modifications to the Physical Layer (PHY) and MAC layer to deliver a throughput of at least 100 megabits per second. The IEEE std. 802.11 Section n is currently at the proposal stage. Several proposals exist. A further objective of the IEEE std. 802.11 Section n is to be downward-compatible with the IEEE std. 802.11 Sections a, b, and/or g. Multi-carrier signals, such as orthogonal frequency division multiplexed (OFDM) signals may communicated, which may be in accordance with the IEEE std. 802.11 Sections a, g, and/or n; the IEEE std. 802.16; or spread spectrum signals may be communicated in accordance with the IEEE std. 802.11 Section b.

MSDU 215 wirelessly transmits frames of data from management processor 10 to host processor 20 for processing and multiple MAC interface 240 sends the data packets with different MAC addresses. The data packets of application software 201 are sent through MSDU 235 of HAP driver 230 for transmission through the network.

HAP driver 230 transmits the data of application software 201 to multiple MAC interface 240. Multiple MAC interface 240, which may be compatible with IEEE std. 802.11 Sections a, g, and/or n, is an upper MAC device that supports two nodes at the same time, although the scope of the invention is not limited in this respect. The two nodes are management processor 10 and host processor 20. It is to be noted that the management processor 10 no longer includes a separate 802.11 compatible upper MAC driver.

Host processor 20 includes 802.1x supplicant program 220 that may transmit data or message packets to the network. The data is placed on transmission control protocol/internet protocol (TCP/IP) stack 225. Next the data is transmitted to multiple MAC interface 240 for transmission to the network. The data of host processor 20 is then routed to MSDU (host media access control (HMAC) for host processor 20) 255 for transmission to wireless NIC 30. Similarly, the data of management or embedded processor 10 is transmitted to MSDU (embedded media access control (EMAC) for management or embedded processor 20) 250 of multiple MAC interface 240 for transmission to wireless NIC 30.

Wireless NIC 30 may have twin micro-code 260. Twin micro-code 260 may have hardware scheduler 265 to control the transmission of data or message packets by both management processor 10 and host processor 20. The higher priority data is then transmitted to the network via transmitter 270. The transmission prioritization may be first-in-first-out, higher priority, alternate priority and/or a fixed priority, for example, but not by way of limitation.

Figure 3:
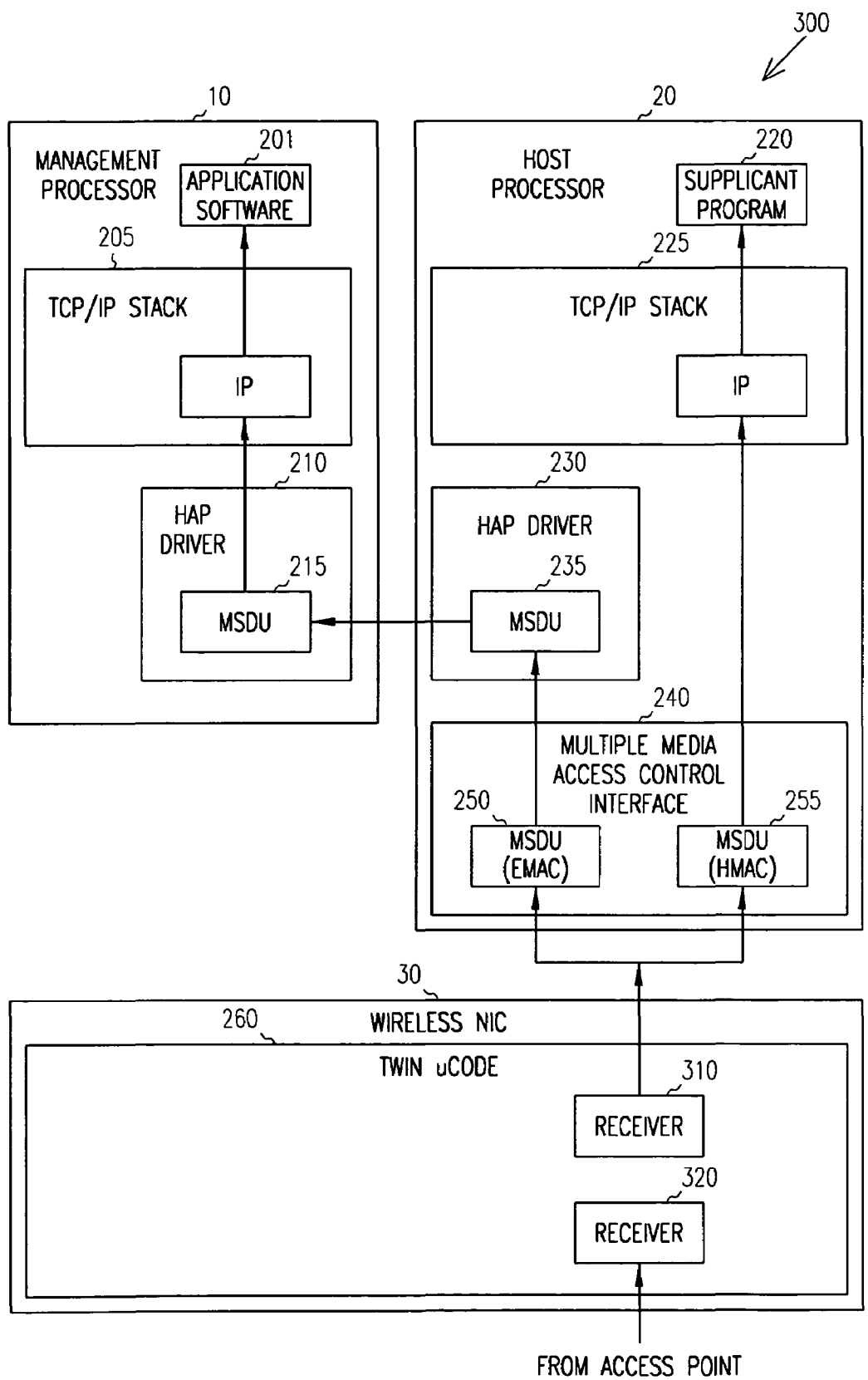
FIG. 3 is a block diagram of wireless telecommunication interface network with multiple media access control for reception in accordance with various embodiments of the present invention.

FIG. 3 is a block diagram of wireless communication interface network with twin media access control 300 for reception in accordance with various embodiments of the present invention. Wireless NIC 30 has receiver 310 and 320. Receiver 320 is the receiving portion of transmitter 270 of FIG. 2. Receivers 310 and 320 respond to the network for two different MAC addresses. The two different MAC addresses also correspond to management processor 10 and host processor 20.

Twin micro-code 260 of wireless NIC 30 wirelessly transmits a data frame of data packets for both addresses to multiple MAC interface 240. Multiple MAC interface 240 separates the data packets by MAC address and routes data packets with a first MAC address to management processor 10 and those data packets with a second MAC address to host processor 20.

Data packets with the second MAC address are routed from multiple MAC interface 240 through MSDU 255 to TCP/IP stack 225. At this point, supplicant program 220 or other applications programs (not shown) may retrieve the data packets.

The data packets for the first MAC address are routed from multiple MAC interface 240 through MSDU 250 to MSDU 235 of HAP driver 230. HAP driver 230 wirelessly transmits the data packets with the first MAC address to MSDU 215 of HAP driver 210.

MSDU 215 transmits these data packets to TCP/IP stack 205. An application program, such as application program 201, can then retrieve the data packets and utilize the data.

Figure 4:
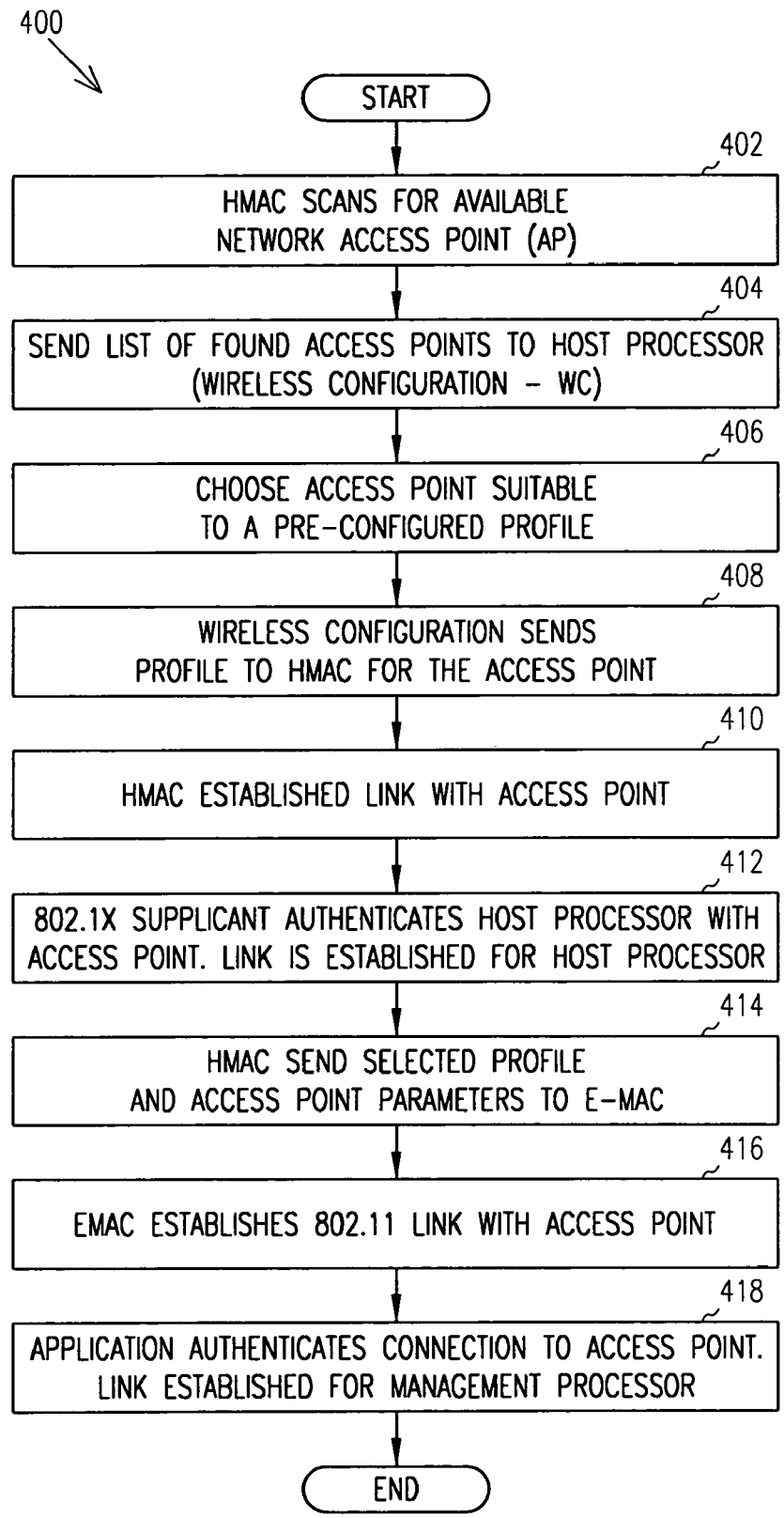
FIG. 4 is a flow chart of a detailed method for link establishment in accordance with various embodiments of the present invention.

FIG. 4 is a flow chart of a detailed method for link establishment 400 in accordance with various embodiments of the present invention. The multiple MAC interface 240 of host processor 20 has two or twin media access controls; the first MAC 255 is referred to as the host MAC or simply HMAC. The second MAC 250 of multiple MAC interface 240 of management processor 10 is referred to as the management or embedded MAC or simply EMAC. The link establishment method 400 provides for host processor 20 establishing communication between management processor 10 and a network.

In some embodiments of the present invention without APs, wireless coupling directly to a network may be accomplished directly from wireless NIC 30. In such embodiments, the operations of method 400 pertaining specifically to an AP may be omitted or modified as are known and necessary to couple wireless NIC 30 to a network.

The method is started and block 402 is entered. The HMAC 255 scans for the available APs 31-32 in FIG. 1, block 402. HMAC 255 then sends a list of the available APs 31-32 to host processor 20 to determine which of the Aps 31-32 are configurable by host processor 20 (e.g., wireless configuration (WC)), block 404.

A suitable AP is chosen according to a pre-configured profile, block 406. Wireless configuration of host processor 20 sends the pre-configured profile of host processor 20 to HMAC 255 for the particular chosen AP 31, for example, block 408.

HMAC 255 then establishes wireless communication link 40 through wireless NIC 30 to the chosen AP 31, block 410. The link may be compatible with the IEEE std. 802.11, Sections a, b, g, and/or n, although the scope of the invention is not limited in this respect.

An application program (e.g., supplicant program) 220 of host processor 20 authenticates wireless link 40 and the link between AP 31 and wireless NIC 30 and host processor 20. Afterward, wireless link 40 and the link between AP 31 and wireless NIC 30 is established between AP 31 and host processor 20, block 412.

HMAC 255 then sends the selected profile and parameters (e.g., quality of service (QoS), signal-to-noise ratio, etc.) of the chosen AP 31 to EMAC 250 in FIG. 2, block 414. EMAC 250 then establishes wireless link 40 and the link between AP 31 and wireless NIC 30 between management processor 10 and AP 31, block 416. The Both links 40 and the link between AP 31 and wireless NIC 30 between management processor 10 and AP 31 may be compatible with the IEEE std. 802.11 Section a, b, g, and/or n, although the scope of the invention is not limited in this respect.

Application software 201 of management processor 10 of FIG. 1 then authenticates the link, extending from management processor 10, to MDSU 215, through HAP driver 230, through multiple MAC interface 240, through wireless NIC 30 to AP 31, block 418. The link mentioned above is then established for management processor 10. The method is then ended.

Figure 5:
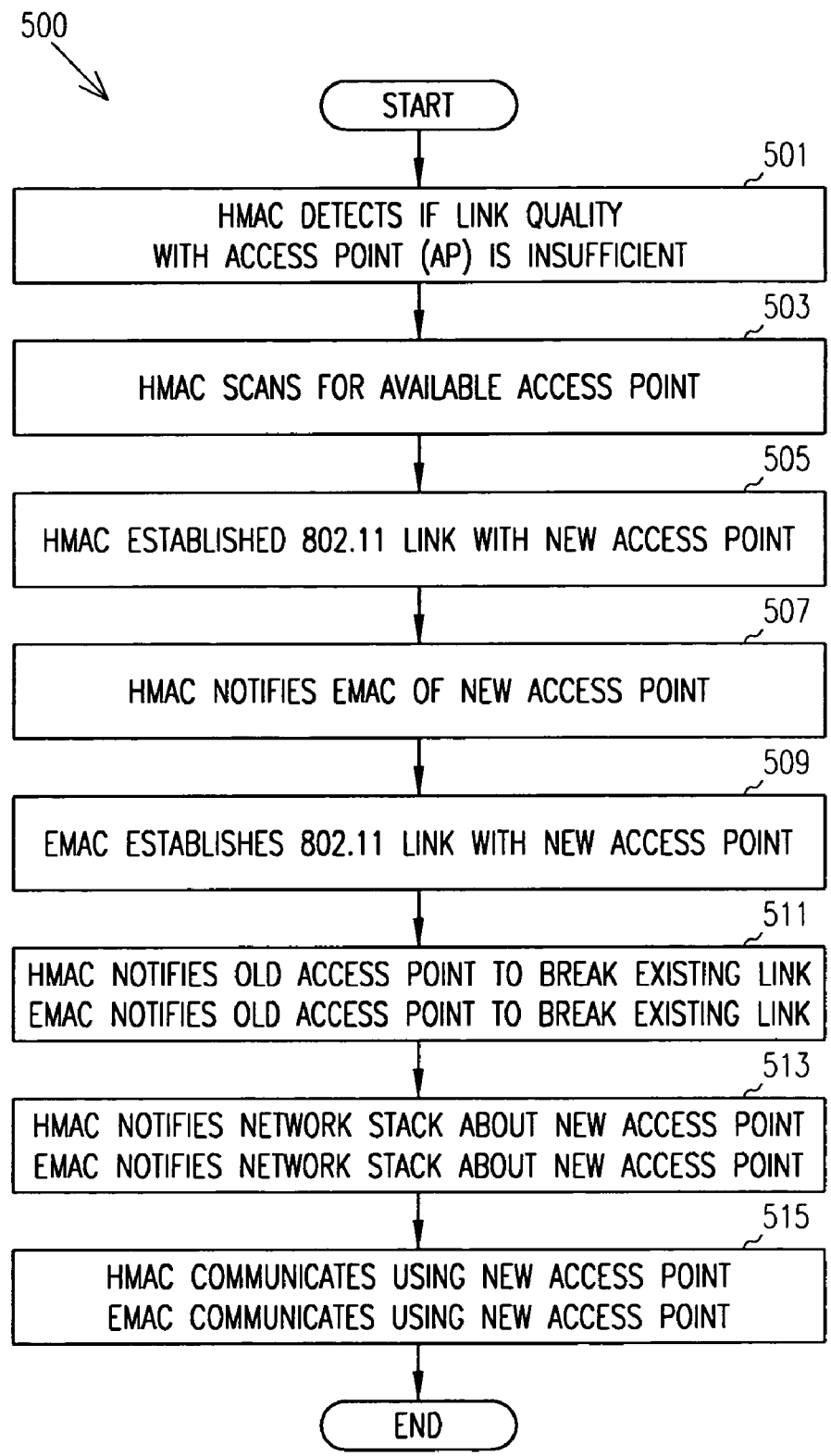
FIG. 5 is a flow chart of a detailed method for roaming link re-establishment in accordance with various embodiments of the present invention.

FIG. 5 is a flow chart of a detailed method for roaming link re-establishment 500 in accordance with various embodiments of the present invention. Roaming indicates that a link may suffer loss of quality; and, therefore needs to be replaced by another link or re-established.

In some embodiments of the present invention without APs, wireless NIC 30 may couple wirelessly to a network. In such embodiments, the operations of method 500 may be omitted or modified as are known and necessary to couple wireless NIC 30 to a network.

The method is started and block 501 is entered. HMAC 255 detects that there is insufficient link quality of the coupling between host processor 20 and AP 31, block 501. HMAC 255 scans for all available APs 31-32, block 503.

HMAC 255 then sends a list of all the available APs 31-32 to host processor 20 to determine which of APs 31-32 are configurable by host processor 20 similar to the establishment method 400 above, block 503. A suitable AP is chosen according to a pre-configured profile. Wireless configuration software (not shown) of host processor 20 sends the pre-configured profile of host processor 20 to HMAC 255 for the particular chosen AP 31, for example, similar to block 408 above.

HMAC 255 then establishes wireless link 40 through wireless NIC 30 to the chosen new AP 31, block 505. The link may be compatible with the IEEE std. 802.11, Sections a, b, g, and/or n.

HMAC 255 notifies EMAC 250 of the selection of a new AP 31 of FIG. 1, for example, block 507. Next EMAC 250 of FIG. 1 established an IEEE compatible 802.11 type link between management processor 10 and the new AP 31, block 509.

HMAC 255 notifies the existing AP to break the existing link to the AP with insufficient link quality. EMAC 250 also notifies the existing AP to break the existing link, block 511. HMAC 255 notifies TCP/IP stack 225 about the identity of the new AP 31 of FIG. 1. EMAC 250 notifies TCP/IP stack 205 about the identity of the new AP 31, block 513.

Lastly, HMAC 255 communicates to the network (not shown) using the new AP 31. Similarly, EMAC 250 also communicates to the network (not shown) using the new AP 31, block 515. The method 500 is then ended.

Management processor 10 and host processor 20 may be implemented on separate chips in a chip-set, in various embodiments. In other embodiments, management processor 10 and host processor 20 may be formed as a single chip. However, the implementation is not limited to these configurations. A "chip" is a semiconductor device. A "semiconductor device" may be fabricated by various technologies known to those of ordinary skill in the art such as silicon, gallium arsenide, etc.

The architecture described hereinabove provides a double MAC functionality without complex message exchanges and synchronization between two upper MAC units. These features may be provided by eliminating one of the upper MAC units such as the MAC unit of management processor 10. This architecture may increase reliability and stability of management processor 10.

It should be noted that the methods described herein do not have to be executed in the order described, or in any particular order. Moreover, various activities described with respect to the methods identified herein can be executed in serial or parallel fashion.

It will be understood that although "Start" and "End" blocks are shown, the method may be performed continuously.

The Abstract is provided to comply with 37 C.F.R. §1.72(b) requiring an Abstract that will allow the reader to ascertain the nature of the technical disclosure. It is submitted with the understanding that it will not be used to interpret or limit the scope or meaning of the claims.

In the foregoing Detailed Description, various features may be grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter may be in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although some embodiments of the invention have been illustrated, and those forms described in detail, it will be readily apparent to those skilled in the art that various modifications may be made therein without departing from the spirit of these embodiments or from the scope of the appended claims.

What is claimed is:

1. A wireless communication apparatus that concurrently supports two processors having different media-access-control (MAC) addresses comprising:

a management processor associated with a first MAC address; and a host processor associated with a second MAC address coupled to the management processor via a first wireless link, the host processor including a multiple media access control interface, wherein the multiple media access control interface is wirelessly coupled to the management processor and coupled non-wirelessly to the host processor, wherein the multiple media access control interface is configured to provide wireless communications between the host processor and a network interface card via a second wireless link, and wherein the multiple media access control interface is configured to provide wireless communications between the management processor and the network interface card via the first wireless link and the second wireless link, the multiple media access control interface including:

a first media access control layer to provide wireless communications between the host processor and a network with the first media access control address; and a second media access control layer to provide wireless communication between the management processor and the network with the second media access control address concurrently with the first media access control layer, wherein the first MAC layer is configured to establish a first communication link between an access point and the host processor through the NIC in accordance with a pre-configured profile, the first communication link utilizing the second wireless link, wherein the host processor is configured to authenticate the first communication link, wherein after the first communication link is authenticated, the first MAC layer is further configured to provide selected profile parameters associated with the access point to the second MAC layer and the second MAC layer is configured to establish a second communication link between the access point and the management processor through the NIC in accordance with the selected profile parameters, the second communication link utilizing the first and second wireless links, and wherein the management processor is configured to authenticate the second communication link.

2. The wireless communication apparatus as claimed in claim 1, the management processor further including a first hardware assisted protocol driver, wherein the host processor further includes a second hardware assisted protocol driver, and wherein the first and second hardware assisted protocol drivers provide wireless communication between the management processor and the host processor over the first wireless link, and wherein the second communication link is established by the second MAC layer through both the first and second hardware assisted protocol drivers.

3. The wireless communication apparatus as claimed in claim 2 wherein the network interface card is configured to provide data packets having the second media access control address to the second hardware assisted protocol driver and the network interface card to provide data packets having the first media access control address to the first hardware assisted protocol driver.

4. The wireless communication apparatus as claimed in claim 3 wherein the wireless communication between the first and the second hardware assisted protocol drivers and the wireless communication between the multiple media access control interface and the network interface card comprises either spread spectrum or multi-carrier wireless communication signals, the multi-carrier communication signals comprising a plurality of substantially orthogonal sub-carriers.

5. The wireless communication apparatus as claimed in claim 4 wherein the multi-carrier communication signals comprise orthogonal frequency division multiplexed signals.

6. The wireless communication apparatus as claimed in claim 1, wherein the multiple media access control interface is adapted to change a coupling from a first access point to a second access point for communications from both the host processor and the management processor.

7. The wireless communication apparatus as claimed in claim 1, wherein:

the management processor is implemented on a first semiconductor chip; and the host processor and multiple media access control interface are implemented on a second semiconductor chip.

* * * * *